C. WOODS.
SCOOP BOARD.
APPLICATION FILED MAY 31, 1921.

1,421,336.

Patented June 27, 1922.
2 SHEETS—SHEET 1.

Carl Woods
INVENTOR

BY Victor J. Evans
ATTORNEY

WITNESS:
C. Nye Fraser Jr.

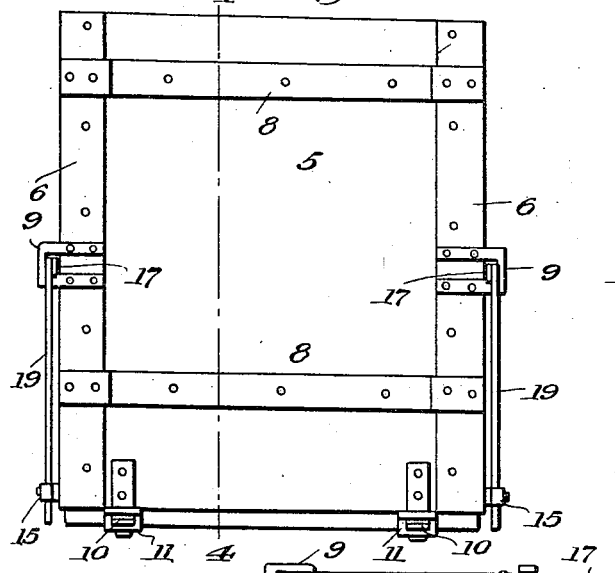
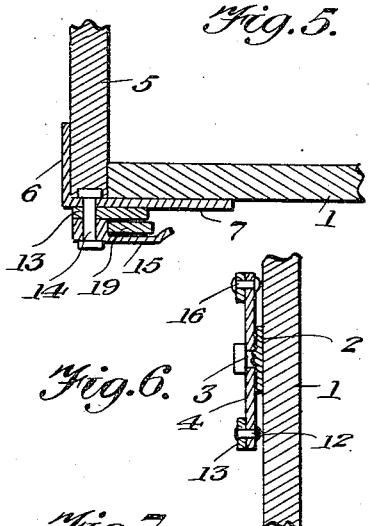
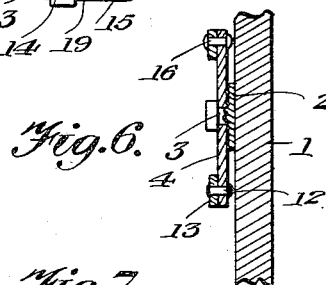
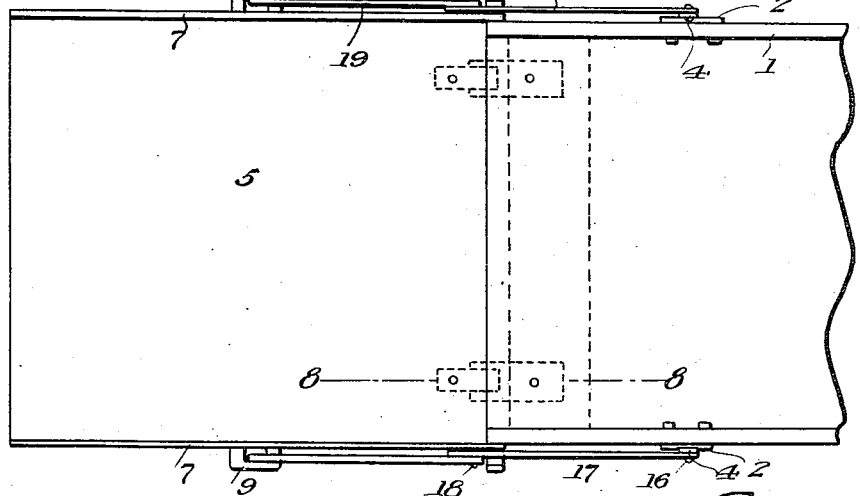
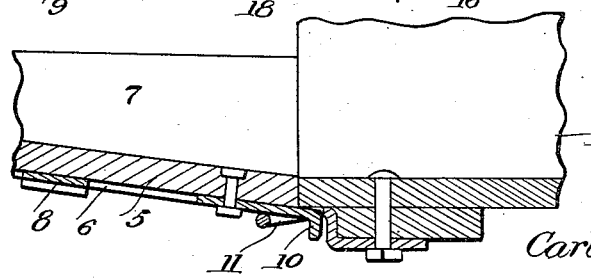

UNITED STATES PATENT OFFICE.

CARL WOODS, OF GRIGGSVILLE, ILLINOIS.

SCOOP BOARD.

1,421,336.                     Specification of Letters Patent.      Patented June 27, 1922.

Application filed May 31, 1921. Serial No. 473,713.

*To all whom it may concern:*

Be it known that I, CARL WOODS, a citizen of the United States, residing at Griggsville, in the county of Pike and State of Illinois, have invented new and useful Improvements in Scoop Boards, of which the following is a specification.

My present invention has reference to a scoop board for wagon bodies.

My object is to produce a scoop board which is hingedly connected to the bottom of a wagon body, which has flanged sides to engage with the sides of the body and to also provide guards for material delivered through the scoop board, means being provided between the sides of the wagon body and the sides of the scoop for holding the same in lowered position and for locking the same when in elevated or closed position, said means forcing the scoop board into tight contacting engagement with the wagon body when in either of its said positions.

The foregoing, and other objects which will appear as the nature of the invention is better understood, may be accomplished by a construction, combination and operative arrangement of parts, such as is disclosed by the drawings which accompany and which form part of this specification.

In the drawings:

Figure 3 is an end view, the scoop board being in closed position, as in Figure 1.

Figure 5 is a sectional view on the line 5—5 of Figure 1.

Figure 6 is a sectional view on the line 6—6 of Figure 1.

Figure 7 is a plan view of the device as illustrated in Figure 2.

Figure 8 is a sectional view on the line 8—8 of Figure 7.

Figure 1:
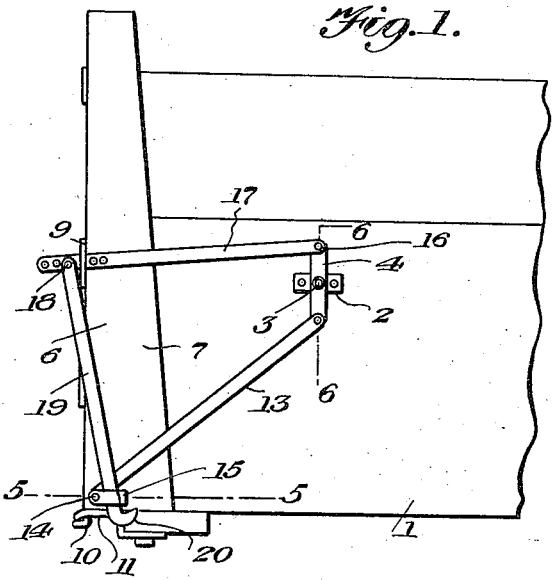
Figure 1 is a side elevation of a wagon body provided with the improved scoop board.
Figure 4:
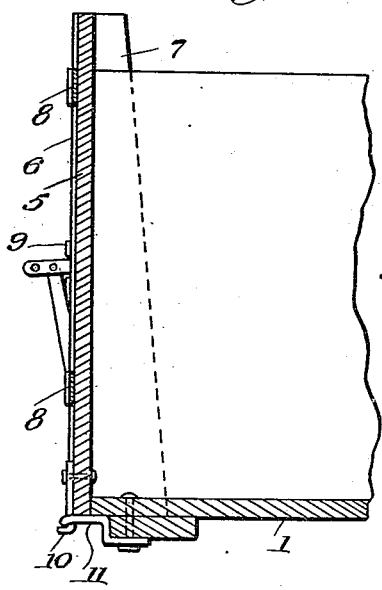
Figure 4 is a sectional view on the line 4—4 of Figure 3.
Figure 2:
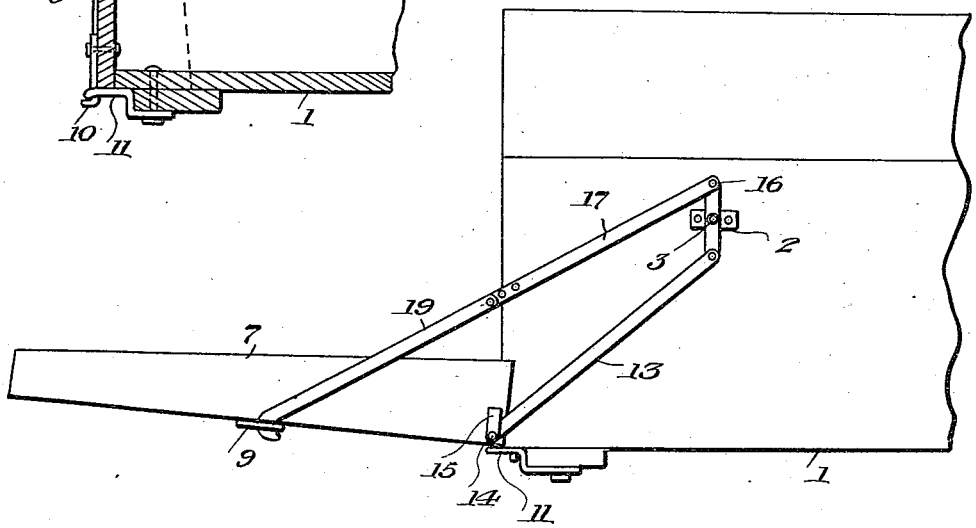
Figure 2 is a similar view but showing the scoop board in lowered position.

The box or body of a grain wagon is indicated, in the drawings, by the numeral 1. To the sides of the body, adjacent the rear open end thereof there are secured plates 2 that are centrally formed with outstanding trunnions 3. Centrally journaled on each of the trunnions 3 is a rocker arm 4.

The scoop board is indicated by the numeral 5, and has metallic reinforcing plates 6 secured to the outer face at the sides thereof. The plates 6 are in the nature of angle members, the side flanges 7 thereof being disposed over the sides of the board proper, and projecting a suitable distance beyond the inner face of the said board. The plates 6, at determined intervals are connected by cross metallic brace plates 8, the said plates being preferably also secured to the body 5. To each of the plates 6, approximately at the center thereof there are secured substantially U-shaped bail members 9. The bails project a suitable distance beyond the sides 7 of the reinforcing plates 6.

On the lower edge of the body 5 of the scoop board there are secured hooks 10 which engage in suitable eyes 11 secured to the under face of the body 1, at the open rear end thereof. In this manner, the scoop board is hingedly connected to the body, the hinged connection, however, permitting the removal of the scoop board from the body when the same is not desired for use.

At each side of the vehicle and having one end pivoted to the lower end of the rocker arms 4, as indicated by the numeral 12 is a link 13. These links are also pivotally connected, as at 14, to the lower and outer corners of the scoop board. The scoop board has its side flanges 7, at its said lower and outer ends provided with spring clips 15. Pivotally secured, as at 16, to the upper ends of each of the rocker arms 4 is an arm 17. The arm, adjacent to its outer end is provided with spaced apertures through one of which is passed a pivot member 18 that connects a lever extension 19 to the arms 17. Each lever 17 passes through the respective bails 9 and has its outer end hooked as at 20.

When the board is in lowered position, the hooks 20 of the levers 19 will be in contacting engagement with one of the longitudinal arms of the bails 9. The swinging of the scoop board to such position will cause the levers 19 to draw on the arms 17 which will swing the rocker arms 4 on their pivots 3, and draw on the links 13 to force the end of the scoop board against the end of the wagon body. As a consequence, a tight joint is established between the scoop board and the wagon body so that grain directed from the body through the scoop board cannot escape at the points of contact of the scoop board with the body. When in closed position, the levers 19 slide through the eyes of the bails 9, permitting the arms 17 to move through the said eyes. The levers 19 are then swung downwardly on their pivots 18 and are brought into engagement with the spring clips. This brings the levers to an angle with respect to the scoop board and causes the latter to again draw on the arms 17 to again swing the rocker arms 4 and draw on the links 13, the latter exerting a pull on the scoop board so as to force the same to tight engagement with the end of the wagon body. Should it be found desirable, the pivots 18 may be removed and again inserted in one of the apertures in the arms 17 to permit of the pivoted ends of the levers contacting with the eye portions of the bails 9 so that the levers will exert a pressure against the said bails when engaged by the clips, and consequently the scoop board is held in tight engagement with the end of the wagon body so that grain cannot escape between the said end and the said board. It is, of course, to be understood that the levers 19 are in contacting engagement with the eyes of the bails when the scoop board is closed, and the adjustment above referred to is only necessary when a looseness occurs in the parts constituting the improvement.

It is thought that the foregoing description, when taken in connection with the drawings will fully set forth the construction and advantages thereof and further detailed description will not be attempted, but it is thought necessary to state that the improvement is not to be limited to the construction illustrated and set forth in this specification as such changes may be made therefrom as fall within the scope of what is claimed.

Having described the invention, I claim:—

1. In combination with a wagon body, of a scoop board therefor, comprising a member having flanged sides and which is hingedly connected to the bottom of the body, rocker arms on the sides of the body, links pivotally connected to the rocker arms and to the lower and outer corners of the body, arms pivotally connected to the upper ends of the rocker arms, a lever having a hooked end adjustably connected to each of the arms, said board having projecting bails through which the levers pass and which are designed to be engaged by the levers when the board is in lowered position and the weight of the board designed to exert a pull on the levers to cause the same to draw on the rods to swing the links to bring the board in tight engagement with the body, and said levers designed to be swung on the arms when the latter have passed through the bails when the board is brought to closed position, and means on the board for engaging with the levers for sustaining the same at an angle and for again causing the levers to draw on the arms to swing the rocker arms to influence the links to bring the board in tight engagement with the end of the body.

2. In combination with a wagon body, of plates having outstanding trunnions secured to the sides adjacent the open end thereof, a rocker arm on each trunnion, a scoop board comprising a body having outer metallic reinforcements, the end reinforcements having flanged sides which project over the sides of the body, U-shaped bails secured to the last mentioned reinforcements and projecting beyond the sides thereof, clips on the lower flanged sides of the scoop board, means for removably hingedly connecting the scoop board to the wagon body, a link pivotally connected to the lower end of each of the rocker arms and to the lower and outer corner of the scoop board, an arm pivotally connected to the upper end of each of the rocker arms and having its free end provided with spaced apertures, a lever having an outer hooked end and adjustably pivoted in one of the apertures of the said arm, said levers passing through the portions of the bails and designed to engage with the bails when the scoop board is lowered, and by virtue of such engagement to draw on the arms to swing the rocker arms to cause the latter to exert a pull on the links and to force the board in tight engagement with the wagon body, and said arms designed to have their outer ends passed through the eyes of the bails when the scoop board is closed on the body and the links to be swung at an angle and to be engaged by the clips and by virtue of such engagement to further draw on the arms to again swing the rocker arms to influence the links to force the scoop board against the end of the wagon body.

In testimony whereof I affix my signature.

CARL WOODS.